Feb. 16, 1926.
E. R. PERSON
1,573,356
METHOD OF SHAPING SHEET PYROXYLIN AND THE LIKE
Original Filed March 15, 1922
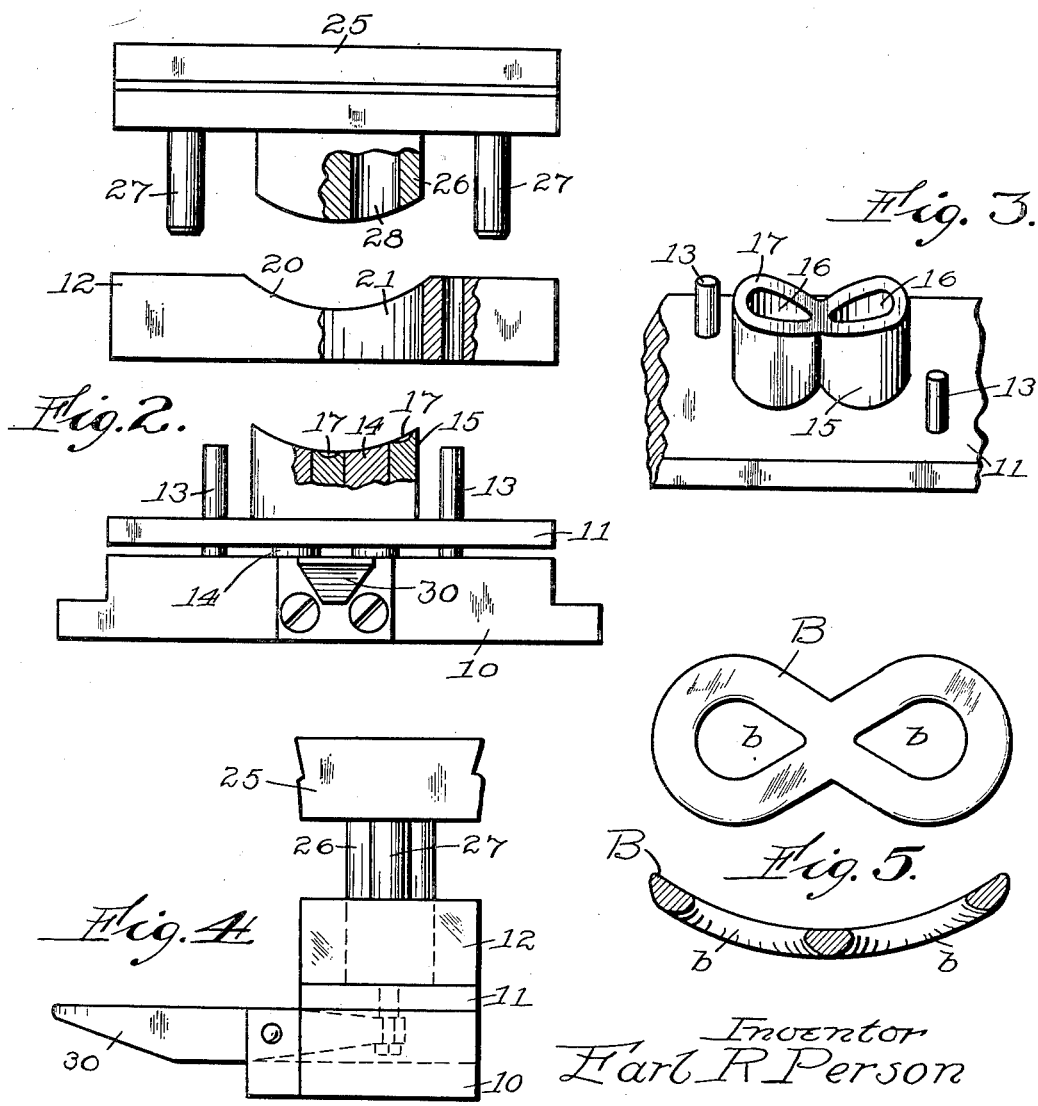

Patented Feb. 16, 1926.

1,573,356

UNITED STATES PATENT OFFICE.

EARL R. PERSON, OF LEOMINSTER, MASSACHUSETTS, ASSIGNOR TO THE VISCOLOID COMPANY, A CORPORATION OF MASSACHUSETTS.

METHOD OF SHAPING SHEET PYROXLIN AND THE LIKE.

Original application filed March 15, 1922, Serial No. 543,938. Divided and this application filed November 19, 1923. Serial No. 675,475.

*To all whom it may concern:*

Be it known that I, EARL R. PERSON, a citizen of the United States, residing at Leominster, in the county of Worcester and State of Massachusetts, have invented a new and useful Method of Shaping Sheet Pyroxylin and the like, of which the following is a specification.

This is a division of my Patent No. 1,492,179 granted April 29, 1924 on an application filed March 15, 1922, Serial No. 543,938.

This invention relates to the manufacture of barrettes, pins and other devices of pyroxylin in sheet form. Heretofore the sheet pyroxylin has been stamped out to the desired shape by cutting dies and then the edges smoothed and the necessary curvature put in it by a separate operation. This necessitated the production of an article having substantially uniform surfaces on both sides because there was no convenient way of changing the thickness of the sheet material. Furthermore, in order to get an article of any specific thickness a blank of the same thickness had to be used.

The principal object of this invention is to provide a method of manufacturing such an article out of a blank thinner than the completed article will be and provide for varying the thickness of the completed article to any reasonable degree so that a product can be secured which will have convex surfaces on its front face, thus making it much more attractive and salable; and to provide for securing these results by simple die punching and pressing operations and without complicating the procedure.

Further objects and advantages of the invention will appear hereinafter.

Reference is to be had to the accompanying drawings, in which

Fig. 1 is a plan and longitudinal section of a blank cut out in the usual way and constituting the material on which the device operates;

Fig. 2 is a front elevation of a complete set of dies and punches made in accordance with this invention, shown separated and partly in section;

Fig. 3 is a perspective view of the dapper die;

Fig. 4 is an end view of the devices shown in Fig. 2, but illustrating them in the position assumed when in operation; and Fig. 5 is a view similar to Fig. 1, showing the finished product.

As has been the case heretofore, a blank of sheet pyroxylin or the like of whatever gauge is desired, say for example, 75/1000 is cut by an ordinary cutter to produce the blank shown in Fig. 1. This has the same outline and general design as the finished article to be produced. These blanks are cut from hot material, leaving a comparatively smooth edge but this has to be smoothed all over further by placing the blanks in a tumbling outfit or rumble. After being tumbled for some time the blanks are put in the press, heated and operated upon by the dapping-up tool or die shown in Figs. 2, 3 and 4. This die changes the material to a thickness of perhaps 90/1000 of an inch, bends it into finished shape and rounds off the edges of the article. After this process is completed the article is then put into another rumble and tumbled, polished and finished as is the usual custom.

The first step of the above mentioned process can produce a blank A such as shown in Fig. 1. This is flat and is usually provided with one or more perforations as *a*. This blank is of the same thickness as the sheet of pyroxylin from which it is cut. The set of dies into which it is placed comprises a base 10, a plate 11 resting thereon and a second plate 12. The plates 11 and 12 are perforated for dowels 13 which constitute guides to keep these plates in proper registration with each other. On the base 10 there are two stationary cores 14 in the present instance, corresponding in shape and size with the perforations *a*. Fixed on the plate 11 is the dapping die proper 15. This dapping die is a projection having the external shape of the blank A and provided with perforations 16 of the same shape as the cores 14. The upper surface is of a general concave form to give the general convex shape to the article which is desired. It has a molding surface 17 for receiving the bottom surface of the blank A and shaping it and this surface is of concave form throughout such part of it as is intended for producing a local convex shape on the article to be produced. The depth of concavity of this surface 17 is greater than the thickness of the blank A. The height of the die 15 is just equal to the width of the plate 12 at corresponding locations.

The plate 12 has an upper concave surface at 20, as stated, corresponding with the general concavity of the surface 17 from one end to the other. In other words, when the plate 12 is located in molding position, as shown in Fig. 4, the extreme upper surfaces of the plate 12 and the dapping die 15 correspond to form a portion of a cylindrical surface. The plate 12, of course, has a perforation 21 therethrough for receiving the dapping die 15 and it exactly fits it.

Above all these parts so far described is a plunger plate 25 having a plunger 26 thereon. This plate has dowels 27 for guiding it in perforations in the plate below and the plunger 26 has perforations 28, or at least depressions, for receiving the cores 14. This plunger is of the exact shape of the blank A externally and has a convex bottom surface corresponding with the concave surface 20. Its lower edge which constitutes its molding surface is smooth and flat except that it is convex in the manner specified.

The process of production is as follows: When the plate 25 is lifted the operator places the flat blank A in the concavity within the center of the top surface of the plate 12 and compresses it down into curved position against the top of the die 15. It will be held there by the fact that its ends engage the edge surfaces of the plate 12 as the die 15 does not come quite to the top of it at the ends. It will be remembered that it is heated. Now, the plunger 26 is forced down on the material and held down to shape the heated blank to the form of the mold. That is, it gives it the form of the completed article B, shown in Fig. 5. This article has a general curved shape from one end to the other or, of course, it may have a wavy or any other shape, but its back, that is, its upper surface, is smooth and continuously concave. Its front surface, the one that is to be exposed when the article is worn, instead of being flat like the blank A is rounded at its edges and each section of it is convex on the front, as shown in the sectional view in Fig. 5. The total thickness of the completed article B is considerably greater than that of the blank A. The perforations b are not modified except that their edges are slanting or convex instead of straight as in the blank. The compression of the blank of celluloid between the parts of the mold sets the article in this form. Then the plunger is drawn up by the press, which is not shown, and the operator presses on a lever 30, the inner end of which is connected with the plate 11 which it moves up. This brings the molded article up above the cores so that the operator can pick it out. It will be observed that the plunger is guided by the cores 14 as well as by the dowels and that the operation is such as to produce an article which is much better finished than can be produced by any of the old methods known to me. Instead of leaving the article in the form of a substantially flat or at least uniform blank, its front surface is actually molded and brought into such shape that it will pass for a hand carved article and the fact that it is made from sheet material is entirely disguised. The finishing or polishing operations are performed afterward as stated above.

Although I have illustrated and described a certain procedure and only one shape of article, I am aware of the fact that the invention can be carried out with modifications in the order of steps and that an article of practically any desired shape can be made without departing from the scope of the invention as expressed in the claim. Therefore, I do not wish to be limited to all the details herein shown and described but what I do claim is:—

The method of molding sheet pyroxylin and the like which consists in cutting out of a flat sheet a blank thinner than the article to be produced, perforating it at exactly the margins at which perforations are desired in the completed product so as to leave the surfaces perpendicular to the flat surface of the blank or sheet and so that the blank at all points will be rectangular in cross section, smoothing the surfaces of the perforated blank and pressing it between two surfaces, one of which is concave and deeper than the thickness of the blank to force all the material originally cut out to form the blank into the die, whereby all the material of the perforated blank is utilized and the product is materially thicker than the original sheet.

In testimony whereof I have hereunto affixed my signature.

EARL R. PERSON.